(12) United States Patent
Fisher et al.

(10) Patent No.: US 6,186,559 B1
(45) Date of Patent: Feb. 13, 2001

(54) TUBE COUPLING ASSEMBLY

(75) Inventors: John Harry Fisher, Novi, MI (US); Kevin Michael Ahaus, Richmond, IN (US); David Alan Campbell, El Paso, TX (US); Henry A. Beckwith, Ypsilanti; Luis Sergio Munoz, Livonia, both of MI (US)

(73) Assignee: Visteon Global Technologies, Inc., Dearborn, MI (US)

( * ) Notice: Under 35 U.S.C. 154(b), the term of this patent shall be extended for 0 days.

(21) Appl. No.: 09/470,547

(22) Filed: Dec. 22, 1999

(51) Int. Cl.$^7$ .................................................. F16L 33/20
(52) U.S. Cl. .................................... 285/256; 285/259
(58) Field of Search ........................... 285/255, 256, 285/257, 259, 921

(56) References Cited

U.S. PATENT DOCUMENTS

| | | |
|---|---|---|
| 2,433,425 | 12/1947 | Burckle . |
| 2,570,421 * | 10/1951 | Baldwin et al. ............... 285/256 |
| 3,453,377 * | 7/1969 | Gillespie .................... 285/256 |
| 3,590,455 | 7/1971 | Harris . |
| 3,699,625 | 10/1972 | Spencer et al. . |
| 4,850,620 | 7/1989 | Puls . |
| 4,969,667 | 11/1990 | Sauer . |
| 5,094,493 * | 3/1992 | Sauer ....................... 285/256 |
| 5,131,687 | 7/1992 | Marchou . |
| 5,176,406 | 1/1993 | Straghan . |
| 5,209,527 | 5/1993 | Hohmann et al. . |

FOREIGN PATENT DOCUMENTS

| | | | |
|---|---|---|---|
| 2241907 * | 3/1973 | (DE) ................... 285/256 |
| 35 06 206 A1 | 9/1986 | (DE) . |
| 561283 * | 5/1944 | (GB) ................... 285/256 |
| 1030485 * | 5/1966 | (GB) ................... 285/256 |
| 662843 * | 4/1964 | (IT) ................... 285/256 |
| 168094 * | 6/1990 | (JP) ................... 285/256 |
| 40-4300491 * | 10/1992 | (JP) ................... 285/256 |
| 92493 * | 9/1958 | (NO) ................... 285/256 |

* cited by examiner

*Primary Examiner*—Eric K. Nicholson
(74) *Attorney, Agent, or Firm*—Larry I. Shelton

(57) ABSTRACT

A tube coupling assembly includes a tube having an end form for attachment to a hose with a notch extending radially inwardly into the end form. The tube coupling assembly also includes a ferrule disposed about the end form and having an end snap-locked into the notch. The ferrule is adapted to be crimped to secure the hose to the tube between the ferrule and the end form.

8 Claims, 1 Drawing Sheet

TUBE COUPLING ASSEMBLY

BACKGROUND OF THE INVENTION

1. Field of the Invention

The present invention relates generally to tube couplings and, more specifically, to a tube coupling assembly.

2. Description of the Related Art

It is known to provide a coupling for attaching a hose to tube such as on an air conditioning system of a motor vehicle. Typically, the coupling has a ferrule, which is bead-locked to the tube. Although the coupling worked well, it requires a machine to lock the ferrule into position on the tube during assembly. Also, the coupling requires several manufacturing operations to form the assembly and different diameter tubes require more or less operations and/or end form tools to form the assembly.

Therefore, it is desirable to provide a new tube coupling assembly with a ferrule that does not require a machine to lock the ferrule into position on the tube during assembly. It is also desirable to provide a tube coupling assembly that requires fewer manufacturing operations to form the assembly.

SUMMARY OF THE INVENTION

Accordingly, the present invention is a tube coupling assembly including a tube having an end form for attachment to a hose with a notch extending radially inwardly into the end form. The tube coupling assembly also includes a ferrule disposed about the end form and having an end snap-locked into the notch. The ferrule is adapted to be crimped to secure the hose to the tube between the ferrule and the end form.

One advantage of the present invention is that a new tube coupling assembly is provided for a hose to tube coupling. Another advantage of the present invention is that the tube coupling assembly has a ferrule that is snap-locked onto an end form of a tube. Yet another advantage of the present invention is that the tube coupling assembly having a removable self-locking thin walled ferrule with tabs and rolled barbs for a hose to tube coupling. Still another advantage of the present invention is that the tube coupling assembly has a snap-lock ferrule that does not require a machine to lock the ferrule into position on the tube. A further advantage of the present invention is that the tube coupling assembly has reduced facility and tooling costs. Yet a further advantage of the present invention is that the tube coupling assembly has reduced manufacturing operations. Still a further advantage of the present invention is that the tube coupling assembly has increased machine capacity and improved quality. Another advantage of the present invention is that the tube coupling assembly has less scrap.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
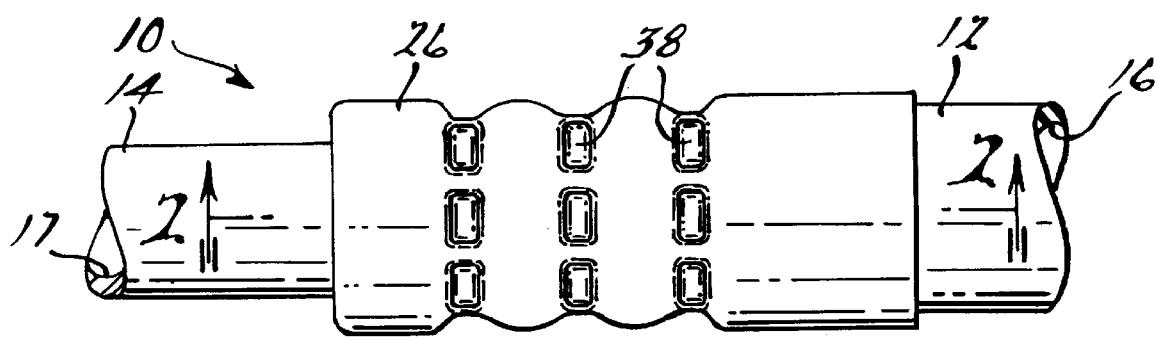
FIG. 1 is an elevational view of a tube coupling assembly, according to the present invention.
Figure 2:
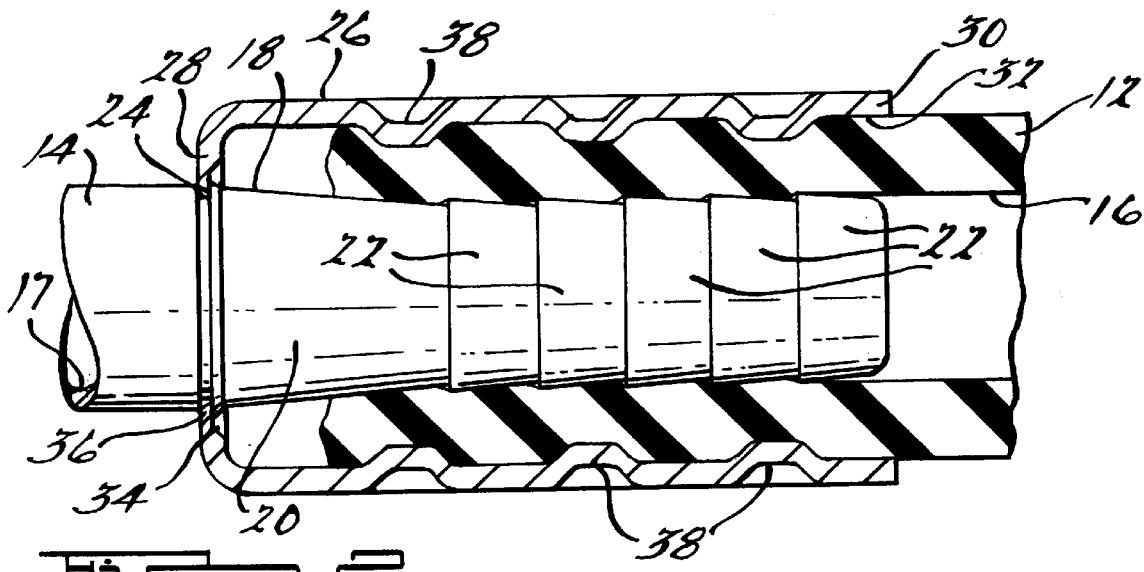
FIG. 2 is a sectional view taken along line 2—2 of FIG. 1.

Referring to the drawings and in particular to FIGS. 1 and 2, one embodiment of a tube coupling assembly 10, according to the present invention, for coupling a hose 12 to tube 14 is shown. The tube coupling assembly 10, in this embodiment, is used on an air conditioning system (not shown) of a motor vehicle (not shown). As defined in this application, the term "assembly" means a flexible member to a rigid member such as a fluid carrying assembly, a tank to header assembly, a heater core assembly, a brake line assembly, a power steering line assembly, a radiator assembly, a transmission oil cooler line assembly or hydraulic lines.

The hose 12 is a tubular member having a passageway 16 extending axially therethrough. The hose 12 has a generally circular shaped cross-section. The hose 12 is made of a flexible material such as an elastomer with a fiber core base. For example, the hose 12 may have a butyl cover over a braided fabric yarn over a nylon barrier as is known in the art. It should be appreciated that the hose 12 is conventional and known in the art.

The tube 14 is a tubular member having a passageway 17 extending axially therethrough. The tube 14 has a generally circular shaped cross-section. The tube 14 has a tube reduction projection or end form 18 extending axially and radially inwardly. The end form 18 is generally frusta-conical in shape. The end form 18 has a transition or tapered portion 20 extending axially and radially inwardly. The end form 18 also has at least one, preferably a plurality of barbs 22 extending axially from the transition portion 20 and spaced axially therealong. The barbs 22 are rolled onto the end form 18 and gradually increase the diameter of the end form 18 by a predetermined amount such as 0.008 inches from the tapered portion 20 to a free end thereof. The tube 14 also includes a locating groove or notch 24 rolled into the transition portion 20 of the end form 18 for a function to be described. The notch 24 is generally annular and extends radially inwardly. The tube 14 is made of a rigid material such as metal, preferably aluminum or steel tubing. It should be appreciated that the hose 12 and tube 14 may be made of various suitable wall thickness and diameters. It should also be appreciated that the tube 14 is a monolithic structure being integral, unitary and formed as one-piece.

Figure 3:
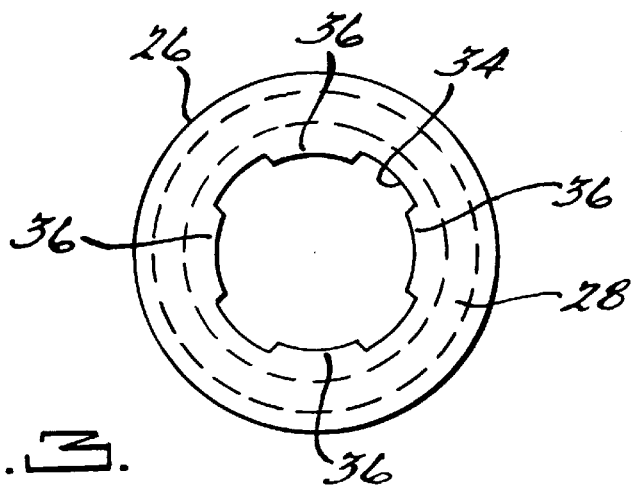
FIG. 3 is an end view of a ferrule of the tube coupling assembly of FIG. 1.

Referring to FIGS. 1 through 3, the tube coupling assembly 10 also includes a ferrule 26 extending axially. The ferrule 26 is a tubular member having a generally circular shaped cross-section. The ferrule 26 has an end portion 28 extending radially and a body portion 30 extending axially from the end portion 28 to form a cavity 32 extending axially inwardly. The ferrule 26 also has an aperture 34 extending axially through the end portion 28 and communicating with the cavity 32. The ferrule 26 has at least one, preferably a plurality of flexible tabs 36 extending radially from the end portion 28 and inwardly into the aperture 34 and spaced circumferentially thereabout. Preferably, four tabs 36 are provided. The tabs 36 are generally rectangular in shape and are disposed in the notch 24 of the tube 14. The ends of the tabs 36 are angled a predetermined amount such as from approximately ten degrees (10°) to approximately thirty degrees (30°), preferably thirty degrees (30°) from a longitudinal axis of the tube 14 to prevent disengagement between the ferrule 26 and the tube 14. The tabs 36 have a predetermined thickness such as 0.025 inches. The tabs 36 are flexible relative to the end portion 28 to allow the tabs 36 to deflect and be disposed in the notch 24. The ferrule 26 has a predetermined wall thickness such as from 0.038 inches to 0.050 inches. The ferrule 26 is made of a rigid material such as metal, preferably aluminum or steel, and is generally cylindrical in shape. It should be appreciated that the ferrule 26 is a monolithic structure being integral, unitary and formed as one-piece.

In operation, the ferrule 26 is disposed over the end form 18 by extending the barbs 22 and transition portion 20 through the aperture 34 in the end portion 28. The ferrule 26 is secured to the tube 14 by deflecting the tabs 36 and snap-locking the tabs 36 into the notch 24. The hose 12 is disposed over the barbs 22 of the end form 18 and underneath the body portion 30 of the ferrule 26. The body portion 30 of the ferrule 26 is crimped to form a plurality or crimps 38 extending radially inwardly and circumferentially. The crimps 38 are generally rectangular in shape, but may have any suitable shape. The crimps 38 create an interference fit between the ferrule 26, hose 12 and end form 18 of the tube 14.

A method, according to the present invention, of making the tube coupling assembly 10 is disclosed. The method includes the steps of providing the tube 14 and reducing the diameter of the tube 14 with an end form tool (not shown) to form the end form 18. The method includes the steps of rolling the barbs 22 and notch 24 in the tube 14. The method includes the steps of providing the ferrule 26 and manually placing the ferrule 26 over the end form 18 and disposing the tabs 36 into the notch 24 by deflecting the tabs 36 and snap-locking the tabs 36 in the notch 24. The steps of rolling and snap-locking may be performed simultaneously. The method includes the steps of placing the hose 12 over the end form 18 and crimping the ferrule 26 to secure the ferrule 26, hose 12 and tube 14 together.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A tube coupling assembly comprising:
   a tube having an end form for attachment to a hose with a notch rolled therein and extending radially inwardly into said end form, said end form having a tapered portion extending axially and radially from said notch and a plurality of barbs extending axially from said tapered portion and rolled onto said end form and gradually increasing a diameter of said end form by a predetermined amount from said tapered portion to a free end thereof, said barbs being annular and spaced axially; and
   a ferrule disposed about said end form and having an end having a plurality of tabs spaced circumferentially and extending radially inwardly and disposed in and snap-locked into said notch, said tabs having an end at an angle of either less than or equal to thirty degrees from a longitudinal axis of said ferrule, said ferrule being adapted to be crimped to secure the hose to the tube between said ferrule and said end form.

2. A tube coupling assembly as set forth in claim 1 wherein said notch is annular.

3. A tube coupling assembly as set forth in claim 1 wherein said ferrule has a body portion extending axially and has an end portion extending radially inwardly to form said end and a cavity extending axially inwardly from another end thereof.

4. A tube coupling assembly as set forth in claim 1 wherein said ferrule is made of a metal material.

5. A tube coupling assembly as set forth in claim 1 wherein said tube is made of a metal material.

6. A tube coupling assembly as set forth in claim 1 wherein said tube and said end form are integral, unitary and formed as one-piece.

7. A tube coupling assembly comprising:
   a tube having an end form for attachment to a hose with an annular notch extending radially inwardly into and rolled in said end form, said end form having a tapered portion extending axially and radially from said notch and a plurality of barbs extending axially from said tapered portion and rolled onto said end form and gradually increasing a diameter of said end form by a predetermined amount from said tapered portion to a free end thereof, said barbs being annular and spaced axially; and
   a ferrule having an end portion extending radially inwardly and a body portion extending axially from said end portion and disposed about said end form, said end portion having a plurality of tabs spaced circumferentially and extending radially inwardly and disposed in and snap-locked into said notch, said tabs having an end at an angle of either less than or equal to thirty degrees from a longitudinal axis of said ferrule, said ferrule being adapted to be crimped to secure the hose to the tube between said ferrule and said end form.

8. A method of making a tube coupling assembly, said method comprising the steps of:
   providing a tube;
   forming an end form on an end of the tube for attachment to a hose by reducing a diameter of the tube to form a tapered portion extending axially and radially;
   forming a notch by rolling into the tube and rolling onto the end form a plurality of barbs extending axially from the tapered portion and gradually increasing a diameter of the end form by a predetermined amount from the tapered portion to a free end thereof;
   providing a ferrule having a body portion extending axially and an end portion extending radially at one end with a plurality of tabs spaced circumferentially and extending radially inwardly and disposing the ferrule over the end form and placing an end of the ferrule into the notch by snap-locking the tabs into the notch;
   providing a hose and placing the hose over the barbs of the end form; and
   crimping the ferrule to secure the ferrule, hose and tube together.

* * * * *